Dec. 2, 1930.  C. H. LANDERS  1,783,438
PROCESS OF MAKING BEARINGS
Filed Jan. 16, 1926   3 Sheets-Sheet 1
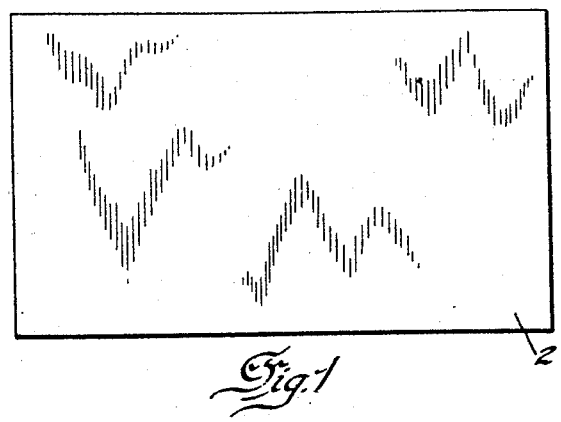
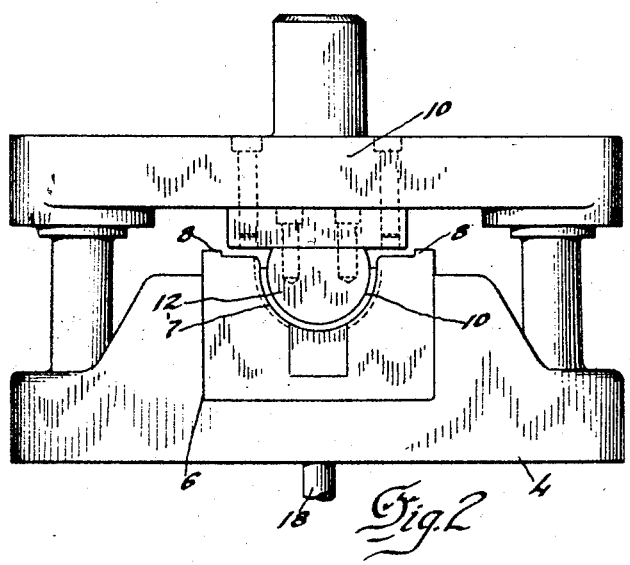
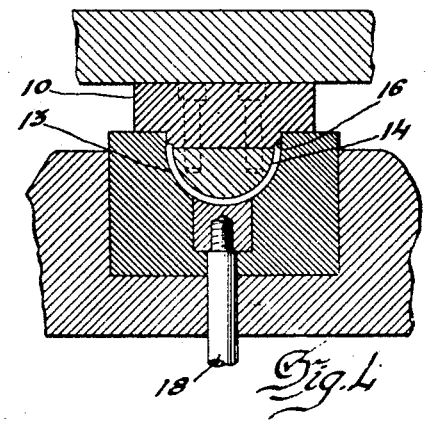
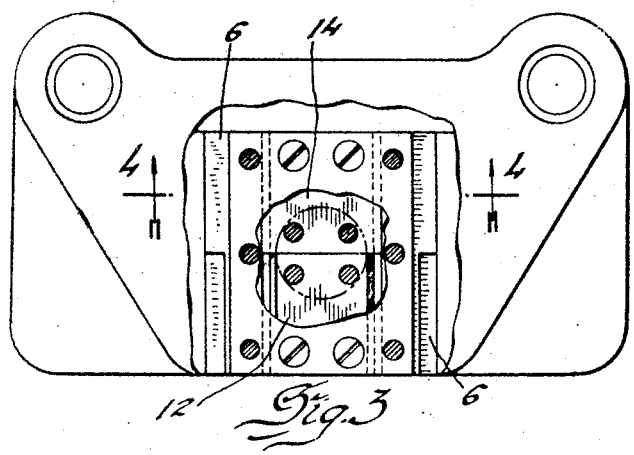
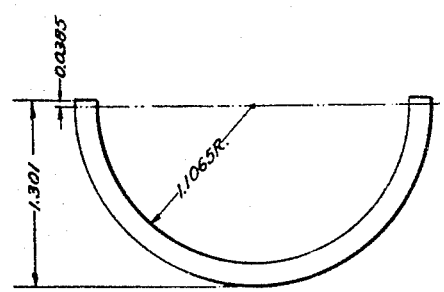
Inventor
Charles Landers
Attorneys Dec. 2, 1930.    C. H. LANDERS    1,783,438
PROCESS OF MAKING BEARINGS
Filed Jan. 16, 1926    3 Sheets-Sheet 2
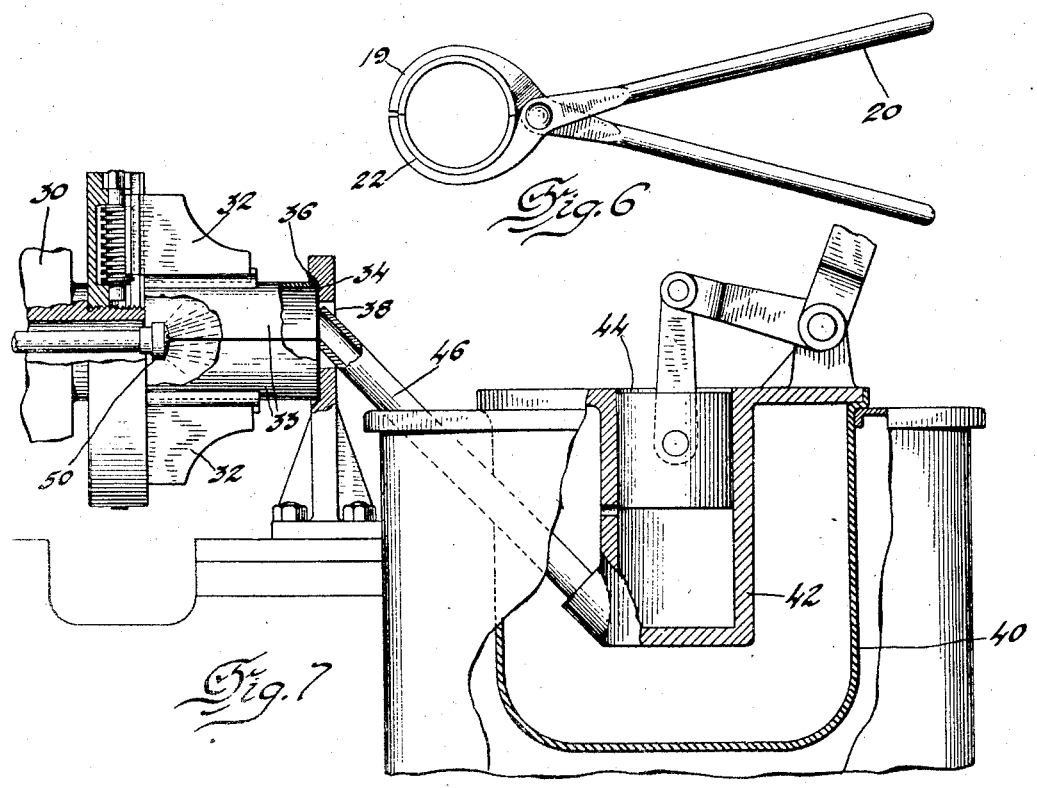
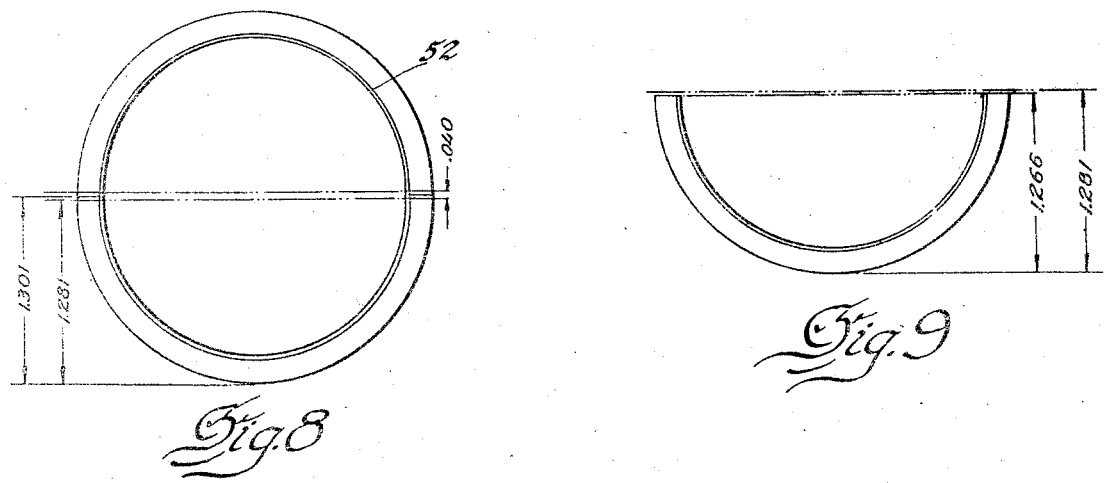
Inventor
Charles Landers
By Blackmore, Spencer & Hail
Attorneys Dec. 2, 1930.  C. H. LANDERS  1,783,438
PROCESS OF MAKING BEARINGS
Filed Jan. 16, 1926  3 Sheets-Sheet 3

Inventor
Charles Landers
By Blackmore, Spencer & Hiatt
Attorneys

Patented Dec. 2, 1930

1,783,438

UNITED STATES PATENT OFFICE

CHARLES H. LANDERS, OF LANSING, MICHIGAN, ASSIGNOR TO GENERAL MOTORS CORPORATION, OF DETROIT, MICHIGAN, A CORPORATION OF DELAWARE

PROCESS OF MAKING BEARINGS

Application filed January 16, 1926. Serial No. 81,766.

It is common practice, particularly in the making of internal combustion engines for automobiles, to employ bearings which are interchangeable; that is, the bearings are customarily formed of identical halves and the halves are manufactured so accurately as to make a correct fit with the shaft for which they are designed without individual hand fitting. By this system unskilled labor may be substituted for skilled labor in the assembling of motors and in their repair and the work may be greatly facilitated. It is also the practice in making bearings of this type to use but a very thin layer of the soft bearing metal, such as babbitt, for the latter is a poor conductor of heat and interferes with the cooling of the bearing.

Many processes have heretofore been employed in the manufacture of this type of bearing. Most of these processes have started with a cylindrical blank, usually of cast bronze. The use of a cylindrical blank permits of babbitting by the centrifugal method, this method having the advantages that the lighter impurities in the babbitt remain on the surface where they may be readily removed by subsequent machining operations while the heavier particles of pure babbitt are thrown outwardly providing a dense homogeneous coating of pure babbitt next to the bearing back. The use of a cylindrical blank also facilitates subsequent machining operations for the blank may be easily held while being broached, turned, or ground.

Where a cylindrical blank is used the chief difficulty encountered is that, after machining, the blank must be cut into two half bearings. In cutting the blank some of the material is necessarily removed and this reduces each bearing segment to less than a half bearing. To overcome this difficulty, according to one method, but a single bearing half was cut from each finished cylindrical bearing, the remaining portion being scrapped. This entailed a great waste of materials.

Another method consists in producing a special blank in which the diameters at right angles to each other are different, the difference being sufficient to compensate for the material removed by the cut. With this shape of blank it is difficult to machine the surfaces to proper size. It is also essential that the cut be made exactly on the minor axis of the illipse constituted by a cross section of the blank and this is difficult to locate.

Another process makes use of a cylindrical blank of cast bronze having a larger diameter than that of the finished bearing. This blank is babbitted, preferably by the centrifugal method, finished interiorly and exteriorly, cut into halves, and then re-formed to the proper radius, in which shape it is set by being subjected to a powerful blow. This blow is applied to one end of the bearing producing a slight upsetting of the ends which results in the bearing contacting with its seat at the ends only. As the ends wear down a knock develops between the bearing back and the seat. Another disadvantage of this process follows from the character of the material use. Cast bronze contains hard and soft spots as a consequence of the casting operation and particularly of the subsequent cooling. In the re-forming operation the hard spots will not bend as readily as the soft spots and will consequently stick up and prevent a good fit in the case. Cast bronze bearing material also has a very coarse molecular structure whereas a dense structure is preferable for the bearing back.

My improved process is marked by the fact that fewer steps are required in the production of the bearing, there is less waste and, perhaps most important, a better bearing is produced. The reduction in the number of steps and in the amount of material used is largely due to the fact that the bearing is originally formed to substantially finished outside dimensions requiring but little subsequent machining and eliminating the necessity for re-forming. The bearing is a better article because it has been subjected to no final upsetting operation tending to produce high spots which would interfere with its seating.

In my process I form the bearing backs from flat sheet metal stock instead of the more expensive and less satisfactory bronze castings. While I prefer to use brass it is obvious that other materials, such as steel, may also be employed if preferred. The sheet material is usually produced by a rolling process and in consequence possesses a dense molecular structure.

From the sheet material a blank is cut of the proper size to make a bearing half and this blank is bent or formed to a diameter so close to finished diameter as to require but a slight finishing operation such as grinding. The bearing segment thus formed subtends more than 180°, the material in excess of a half bearing being provided to allow for a subsequent cutting operation. While not essential yet it is desirable to next slightly trim off the parting line of the bearing blank so that the end surfaces of the blank lie in the same plane. It is preferable at this time also to finish the ends of the blank to proper length but this is not essential.

The next operation is babbitting. In order to secure the benefit of the centrifugal process the segments are placed together in pairs in the form of a finished bearing and are tinned and babbitted while so held. Special appliances are provided for holding the segments together during these operations. When the babbitt cools it holds the segments together. The segments are now cut or sawed apart, the material removed being the excess provided for that purpose. To insure that the saw cut will be made at the proper place the sawing machine is provided with a pointer which engages the joint between the meeting edges of the segments and properly positions the saw blade. While this operation may leave the segments exact halves I have preferred to use a finish broaching or swedging operation at the parting line to reduce the segments to exact angular dimensions.

With the bearing segments approximately final shape they are again placed together to form a complete bearing and are so held while machined to finished inside diameter.

If it is not desired to make use of the centrifugal babbitting process, babbitting may be done by the die casting method in which the bearing half is placed in a suitable die and molten babbitt is forced into the bearing under pressure, a method of babbitting in common use for lining connecting rod bearings. When die casting is resorted to sawing of the blank is dispensed with so that no excess material need be provided in the blank to take care of that operation.

While the original forming operation may give the bearing substantially finished outside dimensions, I have found it desirable to provide a separate machining operation to insure exactness in the outside diameter. For this purpose I have preferably mounted the bearing halves in pairs upon a mandrel using appliances of special design for the purpose. The bearing halves are now ground to finished outside diameter and, after the customary drilling and grooving operations, are ready to be used.

Further details of the invention are set forth in the following specification and illustrated in the accompanying drawings, in which:

Figure 1 is a plan view of a blank from which one of my improved bearings may be formed.

Figure 2 is an elevation of the press in which the blank is shaped.

Figure 3 is a top plan view of the press, parts being broken away.

Figure 4 is a view on line 4—4 of Figure 3.

Figure 5 is an end view of a formed bearing segment.

Figure 6 is a view showing a pair of bearings mounted in a holder for the tinning operation.

Figure 7 illustrates the babbitting apparatus.

Figure 8 is an end elevation of a pair of bearing segments after the babbitting operation.

Figure 9 is an end view of one of the bearing segments after being severed from its companion blank.

Figure 10:
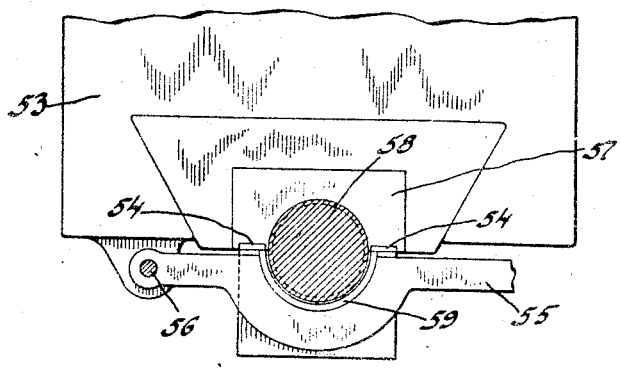
Figure 10 is a top plan view illustrating the apparatus used for the interior broaching operation.

The description of this process which follows sets forth all of the steps customarily employed in carrying out the process in the order in which they are usually taken. However, it is to be understood that neither the number of steps nor the order of steps is an essential part of the invention for these may be varied as desired for particular purposes. Thus a portion of the steps only may be employed where a slightly different or less accurately finished article is desired.

The first step in my process consists in the production of a sheet metal blank of the proper size and shape to form a bearing segment somewhat larger than a finished bearing half. I prefer to use rolled sheet brass for the blank, this material being of dense molecular structure, possessing good wearing qualities, and being relatively easily formed and quite satisfactory from the standpoint of heat transfer and wearing qualities. However, if desired, other materials, such as steel or various alloys, may be used. A blank such as shown at 2 in Figure 1 may be cut from the sheet material in any suitable manner. I have preferred to shear the blank from strips of brass of the proper width.

The next step consists in forming the blank to substantially the shape of a finished bearing segment. Figures 2 to 4 indicate a suitable press which may be used for this purpose. This press is preferably so arranged as to perform two operations upon the blank. It comprises a base 4 in which a forming die 6 is mounted. The upper portion of the front half 7 of the die is formed with shoulders 8 which serve to accurately position a blank for engagement by the front portion 12 of the plunger 10.

With the rear portion 13 of the die is associated the rear portion 14 of the plunger which is provided with shoulders 16 adapted to exert a blow upon the edges of the partially formed blank to set it in bent shape.

In the operation of this press the blank is first inserted in the die between the shoulders 8 and is then compressed between the front portion 7 of the die 6 and the front portion 12 of the plunger 10. This effects a preliminary bending of the blank which is now slid to the rear where it is compressed between the rear portion 13 of the die and the rear portion 14 of the plunger. It is, at the same time, subject to the setting action resulting from the engagement of the shoulders 16 with the edges of the blank. A plunger 18 is preferably provided for ejecting the bent blanks from the die.

As an alternative method the strip of flat stock may be run between rollers and formed so that its shape in transverse section corresponds to that of a bearing segment. The segments may then be cut to proper length from the curved strip. However, I prefer the method first outlined.

The blank thus formed is now subjected to a rough broaching operation at the parting line,—the parting line being the term used to designate the surfaces of the blank which engage corresponding surfaces of a similar blank to form a complete bearing. Figure 5 illustrates the bearing segment as thus far formed. The dimensions shown on this and subsequent figures are taken from one particular design of bearing which was produced by this process. However, no especial merit resides in these particular dimensions, the design being selected for purposes of illustration only. The interior radius of the blank shown in Figure 5 is 1.1065 inches and the parting line measures 1.301 inches. As shown on the drawing the bearing segment subtends more than 180°, a slice of surplus material .0385 inches thick being provided upon each end of the blank to allow for subsequent cutting and finish broaching operation. When this slice of material is removed the segment will constitute exactly a half bearing.

The next step in the process consists in finishing the segment to length, in the example taken, 2.1975 inches in a straddle mill. This operation could, of course, if preferred, be performed at some other point in the process.

The segment is now ready for tinning and babbitting. In these operations it is desirable that the tin and babbitt be prevented from flowing upon or adhering to any except the inner surface of the blank. Thus in tinning I make use of a holder for the blanks which conforms to the surface thereof so closely that tin cannot find its way to the back or ends of the segment. I have illustrated one such holder in Figure 6, the holder taking the form of a pair of tongs 20 having the jaws 19 shaped to exactly fit the bearing segments shown at 22. If desired the jaws may also be provided with flanges to snugly engage the ends of the segments. The tongs are preferably of aluminum to which tin will not readily adhere. With the segments thus held they are dipped in acid; or acid may be applied to the inner surface of the segments by means of a brush. They are then dipped in the tin, a thin layer of the molten metal adhering to the uncovered inner surfaces of the segments.

The next step is babbitting. In this operation I make use of special apparatus. This apparatus comprises a rotatable holder 30 provided with clamping jaws 32 for receiving the tinned bearing segments shown at 33. At one end the segments bear against the holder 30 and at the other end against a standard 34 which is socketed as at 36 to receive them. This standard may be adjustable on the base if desired, and is apertured at 38 to permit the introduction of the molten Babbitt metal into the interior of the cylinder constituted by the two bearing segments.

I have shown conventional apparatus for supplying babbitt to the segments, this apparatus comprising a pot 40 serving as a reservoir for the molten metal and supplying a cylinder 42 in which operates plunger 44, the plunger being operated in any suitable manner to cause a flow of metal through the tube 46 and aperture 38 into the interior of the cylinder.

I have also shown an atomizer nozzle 50 projecting into the cylinder formed by the segments and through which a fine spray of air and water is projected during the babbitting process for cooling. If preferred, air alone may be used.

It is now apparent that with the bearing segments clamped in position, the plunger 44 is manipulated to force a quantity of the molten babbitt upon the inner surfaces of the segments 33. The holder 30 is then rotated briskly spreading the babbitt by centrifugal action in an even layer upon the interior of the segments, the lighter impurities remaining on the surface. At the same time a spray of air and water in very small quantities is ejected from the nozzle 50 for cooling purposes. The bearing segments are thus provided with an interior coating of molten metal which, upon solidification, serves to hold the segments together. The resulting article is shown in Figure 8, the babbitt coating being indicated by the reference character 52.

In some cases I have found it desirable to now mount the cylindrical member formed by the two segments in a chuck of conventional design and to subject it to an interior rough boring operation.

The next step in the process consists in severing the cylinder constituted by the two bearing segments held together by the babbitt lining into two half bearings.

This is done by sawing the cylinder at the parting line of the segments. In the specific instance selected for illustration the saw used removes a slice of metal .04 inches thick giving each of the severed segments a parting line measurement of 1.281 inches. As previously stated the sawing machine is provided with a pointer to engage the joint between the ends of the bearing segments to properly position the saw.

Each bearing segment is now preferably broached or swaged to an exact half, the finished parting line measurement being 1.266 inches as indicated on Figure 9. For this operation conventional equipment may be used, the bearing segment being properly positioned for broaching by the engagement of its outside surface in a proper holder.

With the parting line finished, I may now broach the inner surface of the segment. For this purpose I make use of the apparatus shown somewhat diagrammatically in Figure 10. This consists of a base 53 from which rises vertically extending stops 54 against which the parting line of the segment indicated at 59 is clamped by means of a toggle operated clamping device 55, pivoted at 56 on an accurately ground spindle. The clamping device accurately engages the outer surface of the segment. The reference character 57 indicates a reciprocating holder carrying a broach 58 for engaging the inner surface of the bearing segment. The broach is preferably removably mounted in the holder so as to permit the use of different size broaches.

Figure 11:
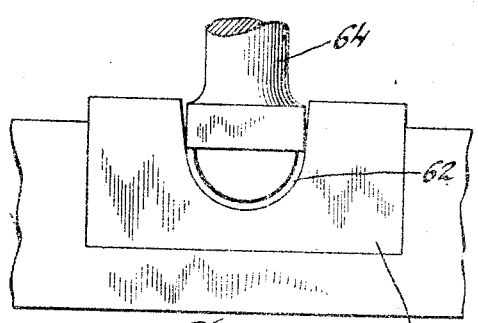
Figure 11 illustrates diagrammatically a form of apparatus which may be used for finishing the parting line.

In the above operations it will be noted that the outer surface of the bearing was made use of as a basis for operations. That is, it was assumed that the outside dimensions of the segment were invariable and the outer surface of the bearing was used for positioning the segment for the other cuts. However, if preferred, I may first form the segment to exact parting line measurement and use this measurement as a basis for subsequent operations, thus avoiding any inaccuracies which may arise from using the outside dimensions as a basis for subsequent cuts. I have illustrated in Figure 11 a simple method for securing a finishing parting line. In this figure, 60 illustrates the die, 62 the bearing segment, and 64 the plunger. Suitable stops are provided to limit the stroke of the plunger. When the plunger is forced home it crowds the metal into the die and leaves it with the exact parting line measurement desired. This parting line may now be used as a basis for subsequent machining operations. Thus for the broaching of the interior surface I may use apparatus such as shown in Figure 10, except that the clamping device 55, instead of having an accurately ground pivot at 56, is provided with a yielding or universal connection with the base 53 so that while the segment is forced firmly against the stops 54 it does not necessarily fit accurately in the seat in the clamping device. By thus working from the parting line which has been accurately formed instead of from the outer surface of the segment which is subject to some variation and has not yet been reduced to finished dimensions, greater accuracy is secured. If desired, the parting line measurement may be reduced by an additional .005 inches by either of the above methods to permit the use of .005 inch shims in the final assembly. It will be assumed that the use of shims is not desired and that each of the bearing segments is now an exact half bearing.

Figure 12:
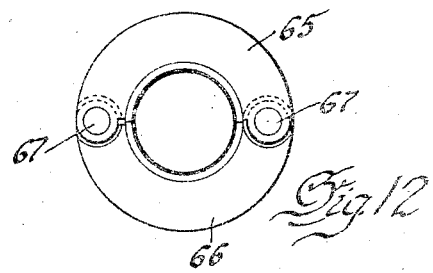
Figure 12 illustrates a pair of babbitted bearing segments arranged in a holder for interior finishing operations.

In Figure 12 I have shown a two-part clamping ring in which the bearing halves are mounted for final interior machining. This ring comprises parts 65 and 66 secured together by means of tapered pins 67. If the bearing segments were broached to less than half bearing size to permit the use of shims it will now, of course, be necessary, when mounting the segments in the clamping ring, to use a shim having a thickness equal to the combined thickness of the shims used in the final assembly.

With the segments properly assembled in the clamping ring they are now subjected to an interior machining operation as by mounting the ring with its contained segments in a suitable machine. This is preferably followed by a finish interior broaching or swaging operation.

In the course of the above treatment the bearing segments have been machined to finished dimensions at the ends, at the parting line, and upon the interior. If desired, the segments may be used in their present condition for the original forming operation left them substantially finished upon their exterior. However, it is preferable to make use of a finish exterior grinding operation. While this operation may be carried out in a number of ways I have preferred to make use of the special appliances to be described. The bearing halves are removed from the clamping ring and the inside and outside ends are chamfered, preferably somewhat more accurately than is the usual practice. A pair of segments is now placed upon a special arbor shown at 70 in Figure 11, and comprising a threaded shaft 72 upon which clamping nuts 74 are mounted, the nuts serving to exert pressure upon clamping rings 76 between which a pair of bearing segments indicated at 33 is placed, the clamping rings having beveled surfaces 78 conforming to the outer chamfered edges 79 of the segments. With the segments thus clamped upon the arbor a grinding wheel shown at 80 is brought to bear upon their outer surfaces reducing them to finished exterior dimensions.

I prefer that the exterior and interior diameter of my bearing shall be approximately .002 inches greater than the diameter of the seat in which it is to fit. The purpose of the .002 inch oversize is this; if the bearing is an exact fit in its seat, when the clamping bolts, which secure the bearing halves together upon the shaft, are drawn up, the point of greatest pressure between the bearing halves and the seats is at the bottom of the seats, whereas with an oversize bearing the effect of the clamping bolts is to force the bearing segments into their seats with uniform pressure all the way around. When the bearings are made oversize, it is preferable when broaching to clamp each half in a holder of the exact size of the seat in the crankcase. This holds the bearing to proper radius so that the cut made by the broach lies on or parallel to a diameter of the finished bearing. However, the difference in diameter, .002 inches, is so slight that it has been found in practice to be sufficient in some cases to merely broach the half in the usual manner—that is, while supported in a holder which does not bend the segment. However, if preferred, the bearing segments may be ground to exact outside diameter.

The subsequent operations follow conventional practice. Thus the bearing is provided with oil grooves, oil apertures, and burrs are removed in the customary manner.

Figure 14:
Figure 14 illustrates a finished bearing segment.
Figure 13:
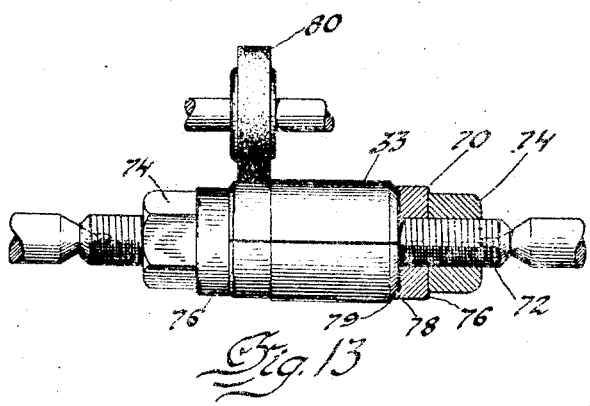
Figure 13 illustrates a pair of bearing segments mounted on a special mandrel for outside machining.

The finished bearing shown in Figure 14, is of exact dimensions all over. It has been subjected to no deformation after it has assumed finished form. It has no high spots. Consequently it will fit properly in its seat and pounding between the bearing back and the seat is entirely avoided. It will also make a perfect fit with the shaft. A minimum amount of material has been used in making the bearing. The character of the material used for the blank is such that but little need be removed from the exterior or the ends of the blank and the amount of tin and babbitt wasted is very small. The use of the centrifugal babbitting process gives a homogeneity to the babbit lining which cannot otherwise be secured.

While I have described at length the entire range of steps used in the process and the exact character of the resulting product it is to be understood that the invention is not limited to the exact details set forth but its scope is defined in the following claims.

I claim:

1. The process of making bearings which consists in forming blanks to the shape of a bearing segment, arranging the blanks to form a tubular member, babbitting the blanks while so held and severing the segments.

2. In the process as defined by claim 1, the bearing metal being distributed upon the interior of the tubular member by centrifugal action.

3. In the process as defined by claim 1, each of said blanks being larger than a finished bearing segment to provide surplus material for the severing operation.

4. In the process as defined by claim 1, the additional step of securing the segments together in pairs to form a tubular member and machining the interior of the segments to substantially finished dimensions while so held.

5. In the process as defined by claim 1, the additional step of machining the segments interiorly, mounting them in pairs upon a mandrel and subjecting them to an exterior grinding operation.

6. The method of forming a bearing which consists in bending a blank and at the same time applying a setting action at the parting line.

7. The method of forming a bearing which consists in subjecting a blank to an initial bending operation and a final bending operation, said last named operation being accompanied by a blow upon the parting line to set the blank in final form.

8. The method of producing a bearing segment which consists in forming a blank to the proper curvature for a finished bearing segment, applying a setting action to the blank to assist it in retaining its shape, and removing the portions of the blank which have been distorted by the setting operation.

9. The method of producing a bearing segment which consists in forming a blank to the proper curvature for a finished bearing segment, said blank subtending a greater angle than the finished segment, subjecting the blank to a setting operation at the parting line to enable it to hold its shape and removing the surplus material at the parting line thus producing a half bearing and effecting the removal of the portions of the blank which have been substantially distorted by the setting operation.

10. The method of making bearings which consists in providing blanks of the proper shape for a bearing half, said blanks being of a size to provide surplus material at the parting line, arranging the blanks in pairs to form a cylinder, applying babbitt to the interior of the cylinder, and distributing it by centrifugal action, severing the blanks at the parting line thereby reducing them to substantially finished angular dimensions, and clamping the segments together in pairs and subjecting them to finished interior machining operations.

11. In the combination as set forth in claim 10, the additional step of mounting the segments in pairs upon a mandrel and subjecting them to an exterior grinding operation.

12. In the method of making bearings as defined by claim 10, the additional step of broaching the bearing segments at the parting line prior to mounting them for the babbitting operation.

13. The method of finishing the parting line of a bearing segment which consists in applying a blow to the segment at the said line to crowd the metal into finished dimensions.

14. The method of machining a bearing which consists in finishing the bearing to finished parting line dimensions and using the parting line to position the blank for a subsequent finishing operation.

15. The method of machining a bearing segment which consists in machining the segment to finished parting line dimensions and machining the inner surface of the bearing while the segment is positioned only by engagement of its parting line with indexing surfaces.

In testimony whereof I affix my signature.

CHAS. H. LANDERS.